(12) United States Patent
Gurevich et al.

(10) Patent No.: US 7,415,210 B2
(45) Date of Patent: Aug. 19, 2008

(54) BIDIRECTIONAL OPTICAL SIGNAL MULTIPLEXER/DEMULTIPLEXER

(75) Inventors: Igor Gurevich, Saarbrucken (DE); Victor Faibishenko, Union City, CA (US); Nikolai Fedyakin, Mountain View, CA (US); Shinkyo Kaku, San Jose, CA (US); Leonid Velikov, San Carlos, CA (US)

(73) Assignee: Allied Telesis, Inc., Bothell, WA (US)

( * ) Notice: Subject to any disclaimer, the term of this patent is extended or adjusted under 35 U.S.C. 154(b) by 827 days.

(21) Appl. No.: 10/628,091

(22) Filed: Jul. 28, 2003

(65) Prior Publication Data

US 2005/0025483 A1 Feb. 3, 2005

(51) Int. Cl.
*H04J 14/02* (2006.01)

(52) U.S. Cl. ............... 398/86; 398/83; 398/85

(58) Field of Classification Search ............. 398/30–34, 398/149, 164, 168–169, 82–88
See application file for complete search history.

(56) References Cited

U.S. PATENT DOCUMENTS

| | | | | |
|---|---|---|---|---|
| 4,244,045 A | * | 1/1981 | Nosu et al. ............ | 398/86 |
| 5,005,935 A | * | 4/1991 | Kunikane et al. ............ | 398/86 |
| 5,485,538 A | | 1/1996 | Bowen et al. | |
| 6,008,920 A | * | 12/1999 | Hendrix ............ | 398/79 |
| 6,075,635 A | | 6/2000 | Butrie et al. | |
| 6,167,171 A | | 12/2000 | Grasis et al. | |
| 6,198,857 B1 | | 3/2001 | Grasis et al. | |
| 6,212,312 B1 | * | 4/2001 | Grann et al. ............ | 385/24 |
| 6,252,719 B1 | | 6/2001 | Eichenbaum | |

* cited by examiner

*Primary Examiner*—Dzung Tran
(74) *Attorney, Agent, or Firm*—Cooley Godward Kronish LLP

(57) ABSTRACT

The optical signal multiplexer/demultiplexer of the invention is characterized by incorporating a bidirectional optical transceiver which is capable of using individual channels working in a transmitting and receiving modes simultaneously. The device consists of a number of optical prisms combined into a single module and provided with appropriate dichroic mirrors and interferrometric filters located on the outer surfaces of the prisms. According to one embodiment of the invention, the module consists of two sequentially arranged parallelogram prisms, a single-channel signal input/output unit with an optical collimator/focusator on one side of the prism module and a two-channel signal output/input unit with a respective optical collimator/focusator on the other side of the prism module. The first prism, which is located on the single-channel side has a first antireflective coating transparent to all input/output signals ($\lambda_1, \lambda_2, \lambda_3$) and a second coating located on the two-channel side of the first prism that reflects one optical signal ($\lambda_2$) and passes the remaining two optical signals ($\lambda_1$ and $\lambda_3$). Thus, the input/output signals of several different wavelengths can be multiplexed/demultiplexed while passing in a multi-bounce zigzag expanded beam light paths in various combinations of signal-propagation directions. A pair of prism modules described above may be built-into a section of the main signal transmission/reception line and the output side of each prism module may be connected to a respective bidirectional optical signal transceiver.

10 Claims, 4 Drawing Sheets

BIDIRECTIONAL OPTICAL SIGNAL MULTIPLEXER/DEMULTIPLEXER

FIELD OF THE INVENTION

The present invention relates to the filed of optical communication, particular to optical signal multiplexers/demultiplexers, and more specifically to those of them which utilize prism-type demultiplexer and bidirectional transceivers. The invention may find application, e.g., on central CATV exchange sides and on subscribers' sides, or in other already installed optical fiber data transmission and communication lines.

BACKGROUND OF THE INVENTION

One of main goals in optical communication and data transmission systems is the most optimal connection between the transmission and receiving sides. In modern systems this goal is achieved by efficient management of optical signals, i.e., by transmitting/receiving signals between communicating sides along the shortest paths and with involvement of the minimal possible quantity of indispensable optical network components.

There exists a great amount of different optical transmission/receiving systems, which are in practical commercial use for optical communication. Recently, an interest arose to possibility of incorporating specific local networks into existing commercial communication systems. Such incorporation must be fulfilled without interference with the signals transmitted through the main lines and without necessity of modification of the aforementioned existing systems, as well as without degradation of their performance characteristics.

For example, let us assume that a long-haul commercial communication line is used for transmitting and receiving data between two sides with optical signals having a wavelength 1550 nm and that a local network incorporated into the main line operates with optical signals having wavelength of 1480 nm and 1310 nm. It is understood that elements of local networks e incorporated a section of the main communication trunk should not interfere with the optical signals transmitted through the main line and should not impair the quality of the main signals.

Incorporation of local networks into main lines can be carried out through the use of optical signal multiplexers/demultiplexers, signal add/drop optical modules, etc.

An example of a multiplexing/demultiplexing module suitable for the above-mentioned purpose is described in U.S. Pat. No. 6,252,719 issued on Jan. 26, 2001 to B. R. Eichenbaum. This module is schematically shown in FIG. 1 in the form of a beam splitter/combiner unit 20 for multiplexing and/or demultiplexing a plurality of optical signals shown in FIG. 1 by arrows with appropriate wavelengths. In the embodiment shown in FIG. 1 the system has three input/output signals of respective wavelengths $\lambda_1$ $\lambda_2$ $\lambda_3$. The module consists of an optical fiber 22 for transmitting and receiving optical signals of wavelengths $\lambda_1$ $\lambda_2$ $\lambda_3$, a collimating lens 24 located in front of the input/output end of the optical fiber 22, a splitter/combiner 26 and three receiver/transmitters 28, 30, and 32 with respective collimating lenses 34, 36, and 38 between the splitter/combiner 26 and respective receiver/transmitters 28, 30, and 32.

The splitter/combiner 26 includes a first dichroic mirror 40 having low loss transmission over a first preselected range of wavelengths including $\lambda_1$ $\lambda_2$ so as to substantially transmit signals having wavelengths $\lambda_1$ $\lambda_2$ through the first mirror 40 and along an optical signal path P of the module 20. The first dichroic mirror 40 also has high reflectance over a second preselected range of wavelengths including $\lambda_3$ so as to substantially reflect from the first mirror 40 signals having wavelength $\lambda_3$. A second dichroic mirror 42, disposed along the optical signal path P for receiving from the first mirror 40 the signals transmitted through the first mirror 40, has low loss transmission over a third preselected range of wavelengths including $\lambda_1$ so as to substantially transmit signals having wavelength $\lambda_1$ through the second dichroic mirror 42. The second dichroic mirror 42 also has high reflectance over a third preselected range of wavelengths including $\lambda_2$ so as to substantially reflect from the second mirror 42 signals having wavelength $\lambda_2$.

Other embodiments of the multiplexing/demultiplexing systems disclosed in the aforementioned patent are based on the same principle and differs from each other by positions of transmitters/receivers relative to mirrors.

A disadvantage of the systems described in U.S. Pat. No. 6,252,719 consists in that the beam splitter/combiners used in these systems are not suitable for use in a bidirectional mode with simultaneous transmission and reception of the signals along the same fiber. This is because all channels used in the system are designed only for a single-operation function, e.g., only for transmitting or only for receiving. In the context of the present invention, the term "channel" means an individual optical fiber used for transmission/reception of optical signals. For example, in the system of FIG. 1, two channels, e.g., those corresponding to the transmitters/receivers 28 and 30, can be used only for reception of the signals, while the channel corresponding to one of the channels can work as a receiver and two channels can work as transmitters. It is understood that the aforementioned module cannot be incorporated into a main long haul communication line, e.g., for bidirectional optical fiber communications between the central telephone exchange side and a subscriber side, which utilizes bidirectional transceivers having individual channels working in a transceiving and receiving modes simultaneously.

Examples of aforementioned bidirectional optical signal transceivers are described in U.S. Pat. No. 6,075,635 issued on Jun. 13, 2000 to T. Butrie, et al., U.S. Pat. No. 5,485,538 issued on Jan. 16, 1996 to T. Bowen, et. Al, and in U.S. patent application Ser. No. 10/107,4346 filed on Feb. 12, 2002 by Igor Gurevich, et al. and relating to optical module for highspeed bidirectional transceiver. U.S. Pat. No. 5,005,935 issued on Apr. 9, 1991 to T. Kunikane, et al. discloses a wavelength-division multiplexing optical transmission system, which transmits light of wavelengths $\lambda_1$, $\lambda_2$, $\lambda_3$ ($\lambda_1 < \lambda_2 < \lambda_3$) by way of a single optical fiber. An optical multiplexer/demultiplexer of the filter type is used which includes a parallelogram prism, a first filter formed on a side face of the parallelogram prism, and second and third filters formed on the opposite side face of the parallelogram. Bidirectional optical fiber communications between the central telephone exchange side and a subscriber side can be achieved using such optical multiplexer/demultiplexer of the filter type. However, similar to the previously criticized module, the parallelogram prism module of U.S. Pat. No. 5,005,935 also cannot be used in optical fiber communications systems, which utilize bidirectional transceivers having individual channels working in a transceiving and receiving modes simultaneously.

U.S. Pat. No. 6,167,171 issued on Dec. 26, 2000 to M. Grasis, et al. and U.S. Pat. No. 6,198,857 issued on Mar. 6, 2000 to M. Grasis, et al. both relate to optical multiplexing devices based on the use of optical prisms with filters and mirrors formed on external surfaces of the prisms.

Thus, U.S. Pat. No. 6,167,171 describes an optical multiplexing device comprising multiple wavelength division multiplexers cascaded together. A first one of the wavelength division multiplexers has a common port and other optical ports, which are optically coupled to the common port. The common port may be optically coupled to a trunk line of a system employing wavelength division multiplexing, for example, a fiber-optic telecommunication system employing 4, 8, 16 or other number of multiplexed channels. The optical ports include multiple channel ports, each of which is transparent to a corresponding wavelength sub-range and reflective of other wavelengths. The second-wavelength division multiplexer has a common port optically coupled to one of the optical ports of the first-wavelength division multiplexer. The second-wavelength division multiplexer also has multiple optical ports, which are optically coupled to its common port and include multiple wavelength-selective channel ports. A waveguide, such as a fiber-optic line, can optically connect the common port of the second-wavelength division multiplexer to an optical port of the first-wavelength division multiplexer. The cascaded WDMs (wavelength division multiplexers) each may be optically coupled to the output of a passive coupler and a housing may be provided defining an enclosed space in which the optical multiplexing device is mounted. Optionally, additional WDMs may be cascaded with the first two WDMs in a parallel or branched formation, an in-line formation or some combination. Preferably, the channels are interleaved, such that they are removed from the multiplexed signal in certain non-sequential order. The optical multiplexing device also may employ compound interleaving wherein adjacent channels are multiplexed by different ones of the cascaded WDMs. The optical multiplexing devices can operate to add signals, remove signals or a combination of both.

In its form as described and shown in the specification of aforementioned U.S. Pat. No. 6,167,171, the module disclosed in this patent cannot be used in conjunction with an optical fiber communications system that utilizes bidirectional transceivers with individual channels working in a transceiving and receiving modes simultaneously.

The second patent, i.e., U.S. Pat. No. 6,198,857, also relates to an optical multiplexing device for multiplexing optical signals, for example, for a fiber-optic telecommunication system employing wavelength division multiplexing. This device is an add/drop type device, which has a filter assembly defining a light path, preferably a multi-bounce zigzag expanded beam light path, from a common port at least to a first channel port and then a second channel port and then a pass-through port. The first channel port has a first optical filter element, for example, a multi-cavity interference filter, which is transparent to a wavelength sub-range within the wavelength range passed by the common port and the pass-through port, and substantially reflective of other wavelengths within such wavelength range. The second channel port includes a second optical filter element having light transmittance and reflectance properties substantially the same as those of the first optical filter element. The optical multiplexing device can be used to extract or drop a selected wavelength sub-range, most typically a single channel signal, from the multiplexed light, and then to inject a new signal into the multiplexed light at that same wavelength sub-range. In accordance with preferred embodiments, the optical multiplexing device serves as an add/drop filter arrangement to extract the signal of a particular channel and then immediately use the available channel by injecting a new signal at that same wavelength sub-range. The device described in this patent possesses the same disadvantages as all the previously analyzed references.

OBJECTS AND SUMMARY OF THE INVENTION

It is an object of the invention to provide a bidirectional optical signal multiplexer/demultiplexer that can be incorporated into existing main signal transmitting/receiving lines and is characterized by the minimal interference with the main optical signals. Another object is to provide an optical signal multiplexer/demultiplexer for use in optical fiber communications systems, which utilize bidirectional transceivers with individual channels working in a transmitting and receiving modes simultaneously. Another object is to provide an integrated optical module composed of a number of prisms that can fulfill the multiplexing/demultiplexing functions with a smaller number of transmission/receiving channels that conventional devices of the same type. Still another object is to provide an optical signal multiplexer/demultiplexer on the basis of a bidirectional optical signal transceiver. It is another object is to provide a bidirectional optical signal multiplexer/demultiplexer, in which adding of optical signals of different wavelengths occurs inside a prism module. Still another object is to provide an optical signal multiplexer/demultiplexer, which is simple in construction, inexpensive to manufacture, highly efficient in operation due to adding of the wavelengths inside the prism module rather than outside the prism, and is suitable for mass production. It is another object is to provide a method of adding wavelengths inside a prism module during transmission and receiving of optical signals through a bidirectional optical signal multiplexer/demultiplexer.

The optical signal multiplexer/demultiplexer of the invention is characterized by incorporating a bidirectional optical transceiver, which is capable of using individual channels working in a transmitting and receiving modes simultaneously. The device consists of a number of optical prisms combined into a single module and provided with appropriate dichroic mirrors and interferrometric filters (hereinafter referred to as filters) located on the outer surfaces of the prisms. According to one embodiment of the invention, the module consists of two sequentially arranged parallelogram prisms, a single-channel signal input/output unit with an optical collimator/focusator on one side of the prism module and a two-channel signal output/input unit with a respective optical collimator/focusator on the other side of the prism module. The first prism, which is located on the single-channel side has a first antireflective coating transparent to all input/output signals ($\lambda_1$, $\lambda_2$, $\lambda_3$) and a second coating located on the two-channel side of the first prism that reflects one optical signal ($\lambda_2$) and passes the remaining two optical signals ($\lambda_1$ and $\lambda_3$).

The first prism has another fully-reflective coating (third coating) on the single-channel side of the first prism. This fully-reflective coating of the first prism is reflective for the optical signal of $\lambda_2$ wavelength. The fourth coating is formed on the two-channel side of the first prism and is transparent for optical signal of $\lambda_2$ wavelength. The fifth coating, which is formed on the single-channel side of the second prism, passes the $\lambda_1$ and $\lambda_3$ wavelength optical signals into/from the body of the second prism. Similar to the first prism, the second prism also has another coating (the sixth coating) on the two-channel side of the second prism. The sixth coating is transparent to $\lambda_1$ wavelength optical signal, but reflective to $\lambda_3$ wavelength optical signal. The second prism has on its single-channel side a seventh coating which is transparent to $\lambda_2$ wavelength optical signal, but reflective to $\lambda_3$ wavelength optical signal. Inside the body of the second prism, the $\lambda_2$ wavelength optical signal is added to (conjugated with) $\lambda_3$ wavelength optical signal so that both these signals propagate through the body of the second prism in mutually opposite directions along the same optical path. When the system utilizes a bidirectional transceiver, the signals $\lambda_1$ and $\lambda_2$ may propagate together in one direction, together in the direction opposite to the first one, or in mutually opposite directions. What is important is that signals $\lambda_2$ and $\lambda_3$ always propagate in mutually opposite directions.

Meanwhile, the $\lambda_1$ wavelength optical signal may pass from the collimator/focusator through the sixth coating on the two-channel side of the prism towards the sixth coating or may enter the collimator/focusator from the side of the sixth coating of the module.

Thus, the input/output signals of several different wavelengths can be multiplexed/demultiplexed while passing in a multi-bounce zigzag expanded beam light paths in various combinations of signal-propagation directions. A pair of prism modules described above may be built-into a section of the main signal transmission/reception line and the output side of each prism module may be connected to a respective bidirectional optical signal transceiver.

DETAILED DESCRIPTION OF THE INVENTION

A prism-type optical modules of the present invention is intended, e.g., for incorporation of local networks into main optical signal transmission/receiving lines for transmitting local-network signals through a section of the main line without noticeably affecting main optical signals and without interference between the main and the local signals. A prism-type optical module of the invention constitutes the basic component of such a network.

Figure 1:
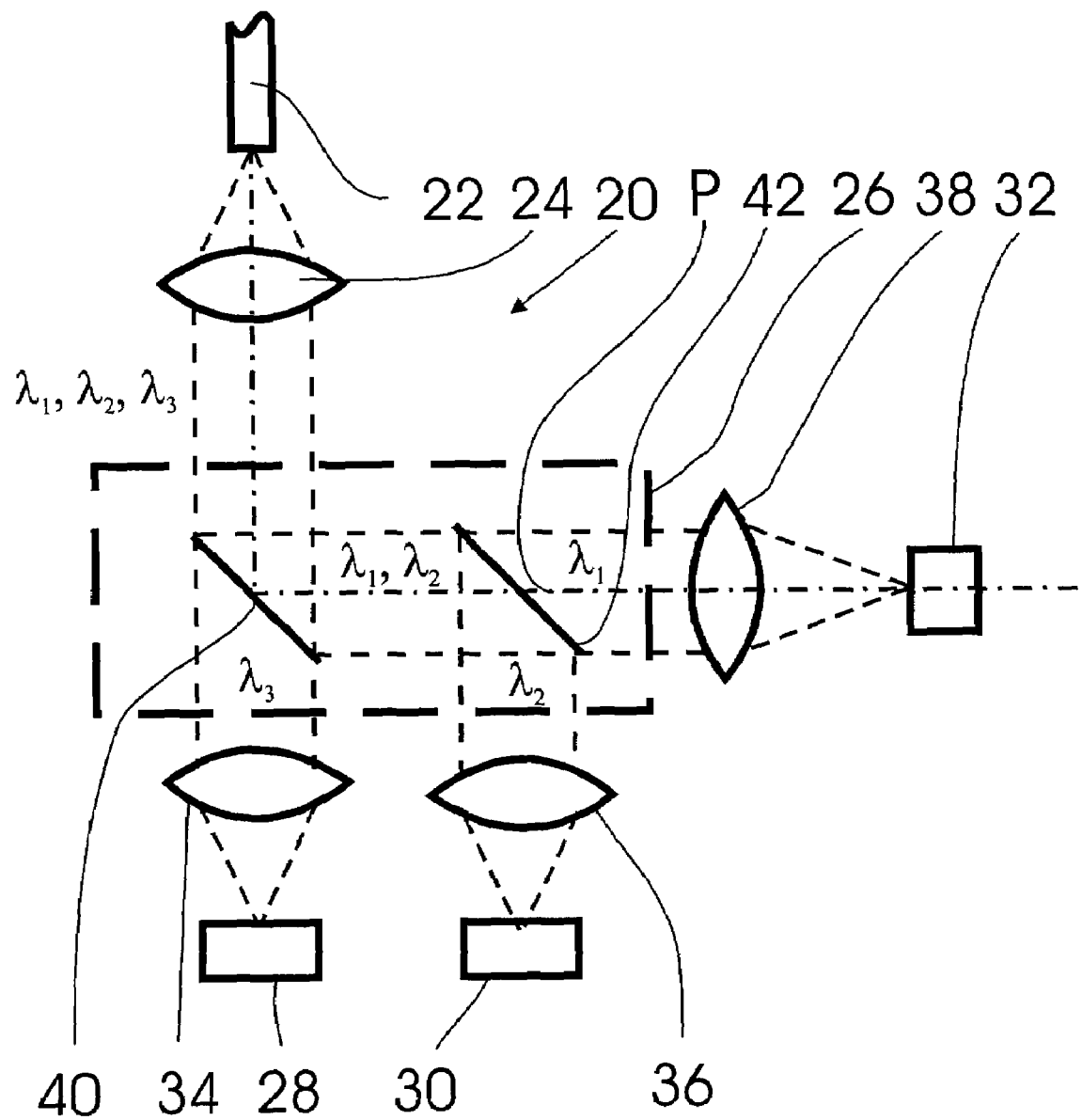
FIG. 1 is a schematic view of a known multiplexer/demultiplexer system for bidirectional transmission and reception of optical signals through individual parallel channels.
Figure 2:
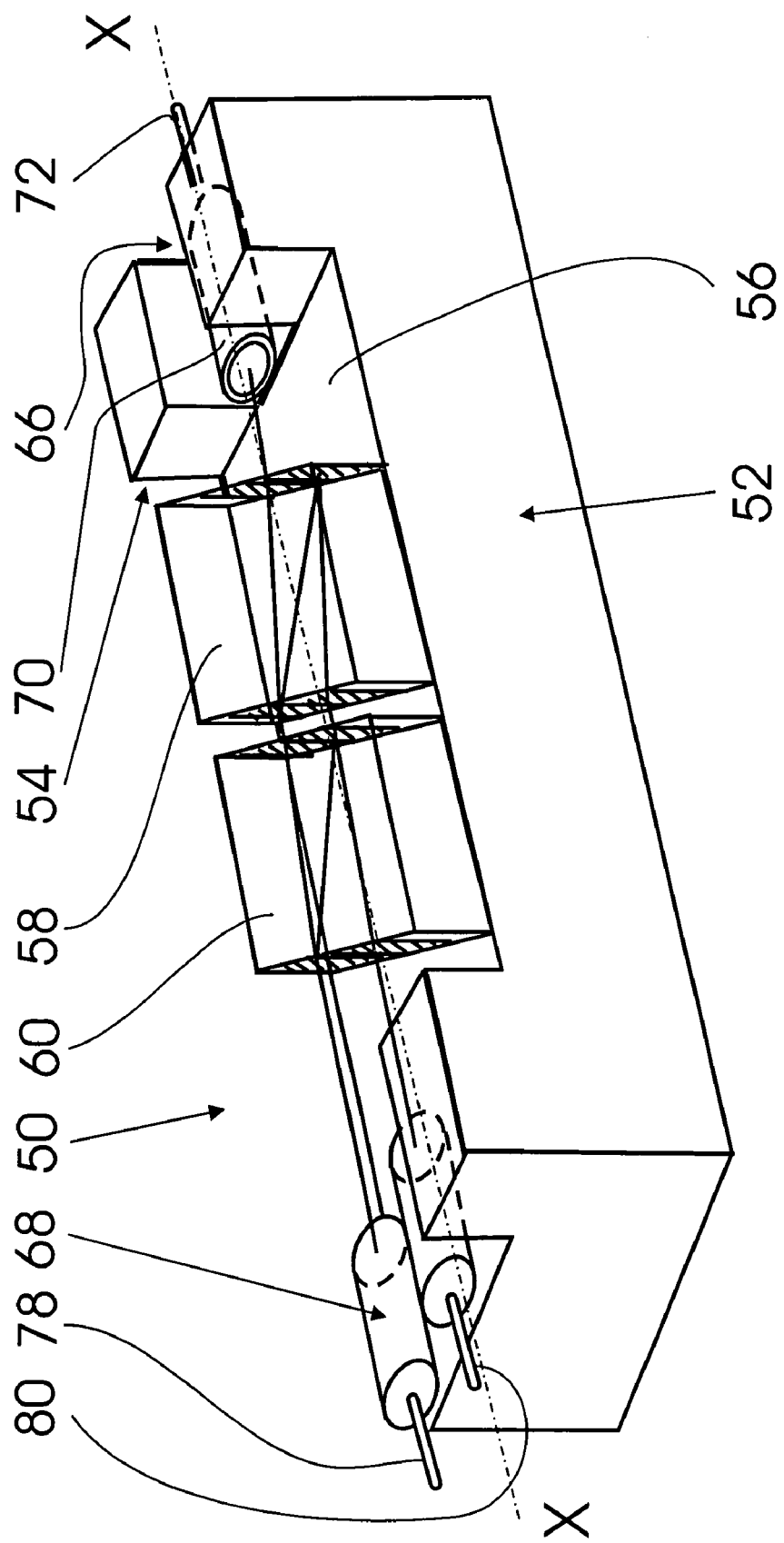
FIG. 2 is a three-dimensional view of a prism-type optical module of the present invention for bidirectional transmission and reception of optical signals through a single common channel, the view illustrating arrangement of the optical components.
Figure 3:
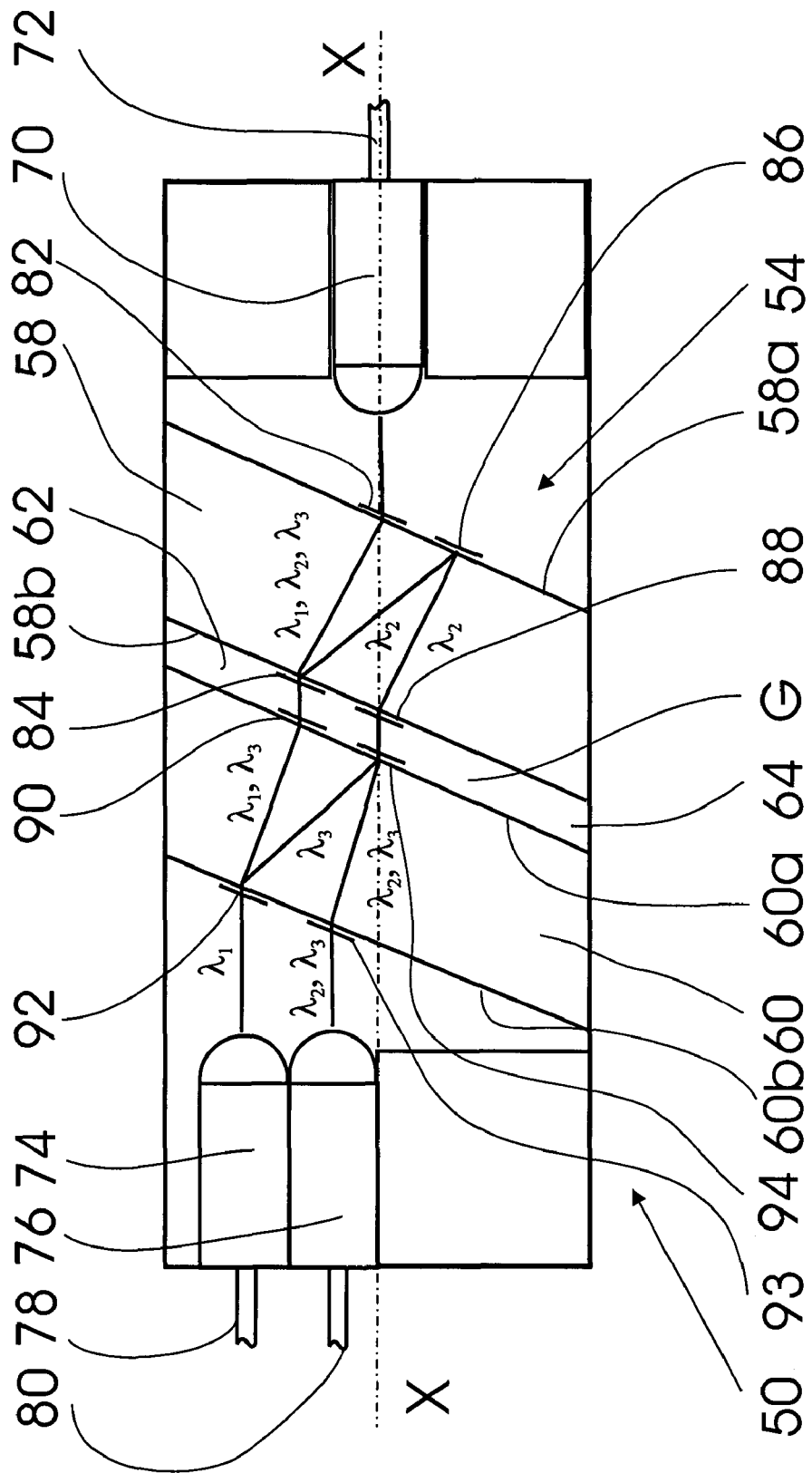
FIG. 3 is a top view of the module of FIG. 2.

FIG. 2 is a three-dimensional view of a prism-type optical module of the present invention for bidirectional transmission and reception of optical signals through a single common channel, the view illustrating arrangement of the optical components. FIG. 3 is a top view of the module of FIG. 2.

As shown in FIGS. 2 and 3, an optical signal multiplexer/demultiplexer module of the invention, which in general is designate by reference numeral 50, has a mounting bench 52 (FIG. 2) with a longitudinal axis X-X and with a recess 54 formed in the bench 52 with a base surface 56, which is finished to a very high degree of flatness. The base surface 56 supports a sub-assembly composed of two sequentially arranged parallelogram-type prisms, i.e., a first parallelogram prism 58 and a second parallelogram prism 60. Each of the prisms 58 and 60 has at least two flat parallel sides. In the illustrated embodiment, the prism 58 has a first side 58a and a second side 58b, which is parallel to the side 58a. The sides 58a and 68b are inclined to longitudinal axis X-X of the mounting bench at a certain angle. The prism 60 has a first side 60a and a second side 60b, which are both parallel to each other and to ides 58a and 58b of the first prism 58. The sides 58a, 58b, 60a, and 60b are inclined to longitudinal axis X-X of the mounting bench 52 at a certain angle. The prisms 58 and 60 are glued to each other by edge layers of glue 62 and 64 so that a gap G is left between the prisms.

As shown in FIGS. 2 and 3, the mounting bench 52 has another recess 66 (FIG. 2) cut in the bench 52 on the side 58a of the prism 58 and a recess 68 cut in the bench 52 on the side 60b of the prism 60. The recesses 66 and 68 are oriented in the direction parallel to axis X-X. The recess 68 is intended for accommodation and alignment of an optical collimator/focusator unit 70 comprising a single-mode optical fiber 72 with a collimating or focusing lens on the end of the optical fiber that faces the side 58a of the prism 58. The recess 68 is intended for accommodation and alignment of two parallel optical collimator/focusator units 74 and 76. Each collimator/focusator unit 74 and 76 comprises a respective single-mode optical fiber 78 and 80 with respective collimating or focusing lenses on the ends of the optical fibers 78 and 80 that face the side 60b of the prism 60. It should be noted that in the context of the present invention each optical fiber corresponds to an individual channel for transmission and reception of optical signals. In accordance with such definition, the side 58a of the first prism 58 faces a single-channel side of the module 50, while the side 60b of the second prism 60 faces a two-channel side of the module 50.

Let us assume that the channel formed by the optical fiber 72 is used for input and output of optical signals of three types having respective wavelengths $\lambda_1$, $\lambda_2$, $\lambda_3$, one of which, e.g., ($\lambda_1$), is a wavelength of the main optical signal transmitted and/or received through the main signal transmitting/receiving line, while two other optical signals with wavelengths $\lambda_2$, $\lambda_3$, e.g., for data exchange in a local network in both directions.

It is understood that the main $\lambda_1$ wavelength signal should enter or exit the module, e.g., through the optical fiber 78, with minimal attenuation and/or distortion on the exit side, while the optical fiber 80 serves for input/output of signals of two other wavelengths.

The side 58a of the first prism 58 has a first antireflective coating 82 transparent to all input/output signals ($\lambda_1$, $\lambda_2$, $\lambda_3$) and a second coating 84 on the side 58b that reflects one optical signal ($\lambda_2$) and passes the remaining two optical signals ($\lambda_1$ and $\lambda_3$).

The first prism 58 has another fully-reflective coating (third coating) 86 on the side 58a of the first prism 58. This fully-reflective coating 86 of the first prism 58 reflects the optical signal of $\lambda_2$ wavelength towards a fourth 88 on the side 58b of the first prism 58, or towards the second coating 84, if this signal fall onto the reflective coating 86 from the opposite direction. The fifth coating 90, which is formed on the side 60a of the second prism 60, is transparent to $\lambda_1$ and $\lambda_3$ wavelength optical signals. For example, in the embodiment shown in FIG. 3, the $\lambda_1$ wavelength optical signal exits the second coating 84 and passes through the fifth coating 90 into the body of the second prism 60, while the $\lambda_3$ wavelength optical signal passes through the fifth coating 90 in the direction opposite to the $\lambda_1$ wavelength optical signal, i.e., towards the first prism 58. The sixth coating 92 is formed in the second side 60b of the second prism 60. The sixth coating 92 is transparent only to the $\lambda_1$ wavelength optical signal which may pass through this coating in both directions, i.e., from the input/output 70, 72 or from the output/input 74, 78. The seventh coating 94 is transparent to $\lambda_2$ wavelength optical signal, but reflective to $\lambda_3$ wavelength optical signal. The eighth coating 93 is transparent to $\lambda_2$ and $\lambda_3$ wavelength optical signals in both directions, so that these signals can be propagate simultaneously in mutually opposite directions along the same optical path.

When the system utilizes a bidirectional transceivers, which are described later, the signals $\lambda_1$ and $\lambda_2$ may propagate together in the same direction, in the direction opposite to the first one, or in mutually opposite directions.

Meanwhile, the $\lambda_1$ wavelength optical signal that, in the embodiment of FIG. 3, passed through the sixth coating 92 enters or exits the collimator/focusator 74 of the first output/input channel 78, on the two-channel side of the prism module 50. Furthermore, in the embodiment of FIG. 3, the $\lambda_2$ wavelength optical signal enter the collimator/focusator 76 of the second output/input channel 80 on the two-channel side of the prism module 50.

Thus, the input/output signals of several different wavelengths can be multiplexed/demultiplexed while passing in a multi-bounce zigzag expanded beam light paths through respective high-reflective and anti-reflective, or combined reflective-transmissive coatings with various combinations of signal-propagation directions.

A pair of prism modules described above may be built-into a section of the main signal transmission/reception line and the output side of each prism module may be connected to a respective bidirectional optical signal transceiver.

Figure 4A:
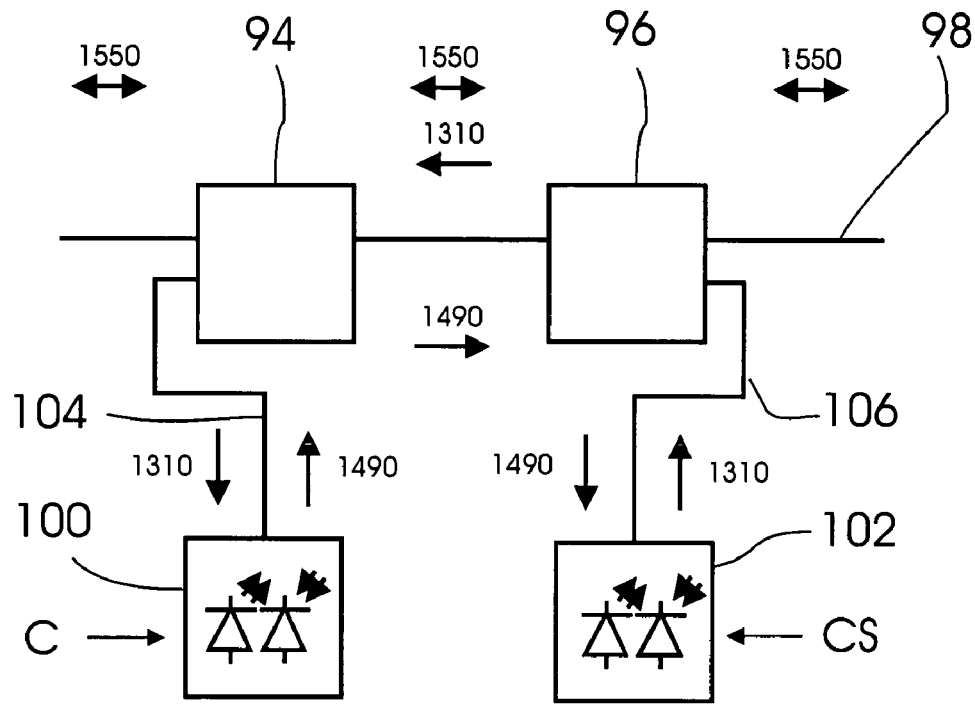
FIG. 4A is a schematic views of network consisting of prism-type optical modules of the invention, incorporated into the main optical signal transmission/receiving line, and bidirectional optical signal transceivers.

FIG. 4A is a schematic views of a network consisting of a section of the main line 98 and prism-type optical modules 94 and 96 of the type described above incorporated into the main optical signal transmission/receiving line 98. Data exchange between, e.g., a central station CS, and a customer C is carried out through bidirectional transceivers 100 and 102 connected to one of output/input channels, formed by optical fibers 104 and 106 on the two-channel sides of respective modules 94 and 96.

In the embodiment of the network shown in FIG. 4A the main line transmits/receives 1550 nm-wavelength optical signals. As can be seen from this drawing, the main line 98 is interrupted in two points and is reconnected through the prism-type optical modules 94 and 96, i.e., through first signal transmission/reception channel (70, 72 in FIG. 3) and the second signal transmission/reception channel (74, 78 in FIG. 3). The third of each module the said second signal transmission/reception channel transmission/reception channel (76, 80 in FIG. 3) is connected to a respective bidirectional transceiver 100 and 102.

Figure 4B:
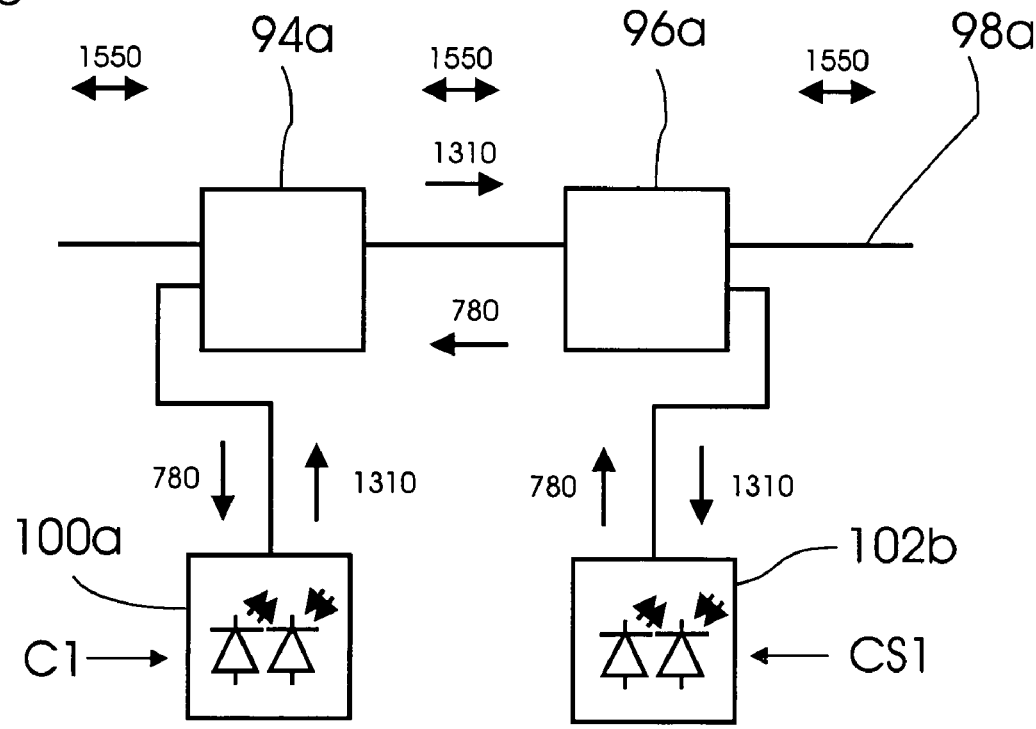
FIG. 4B is a view of a network similar to the one shown in FIG. 4A but intended for transmission of optical signals having different wavelength combination of transmission and reception signals.

These signals pass through the local network as transit signal. At the same time, the section of the main line 98 between the modules 94 and 96 is used as a part of a local network for bidirectional transmission/reception of 1310 and 1480 nm optical signal between the central station CS and the customer C FIG. 4B illustrates the same network for processing optical signals of other wavelengths. In this embodiment the main line transmits/receives the same 1550 nm-wavelength optical signals, while the section of the main line 98a between the modules 94a and 96a is used as a part of a local network for bidirectional transmission/reception of 780 and 1310 nm optical signal between the central station CS1 and the customer C1.

Assembling of the bidirectional optical signal multiplexer/demultiplexer module of the invention will be now explained with reference to FIG. 2. All optical components of the module are assembled on the mounting bench 52, which has been premanufactured with a very high degree of flatness on the support surface 56 of the mounting bench 52. Support surfaces formed on the bottoms of recesses 66 and 68 of the mounting bench 52 should also be treated to a high degree of flatness. They also have to be strictly parallel to the support surface 56. Similarly, the support surfaces of the parallelogram prisms should be finished to high degree of flatness and with high parallelism of sides for receiving and exiting light signals.

The second side 58b of the first prisms 58 is glued to the first side 60a of the second prism 60, whereby both prism are connected into an integral prism unit which is secured, e.g., by glue, to the support surface 56 of the mounting bench 52. The sides of the prisms are oriented so that their respective coatings 82, 86, 84, 88, 90, 94, 96 lie on the zigzag optical path of optical signals of different wavelengths. Best performance characteristics of the module are provided when all parallel sides of both prisms are arranged at a certain angle towards the axis X-X different from 90°, e.g., at about 70°.

Thus it has been shown that the invention provides a bidirectional optical signal multiplexer/demultiplexer that can be incorporated into existing main signal transmitting/receiving lines and is characterized by the minimal interference with the main optical signals. The invention provides an optical signal multiplexer/demultiplexer for use in optical fiber communication systems which utilize bidirectional transceivers with individual channels working in a transmitting and receiving modes simultaneously. The invention further provides an integral optical module composed of a number of prisms that can fulfill the multiplexing/demultiplexing functions with a smaller number of transmission/receiving channels than conventional devices of the same type. The optical signal multiplexer/demultiplexer is based on the use of a bidirectional optical signal transceiver. Conjugation of optical signals of different wavelengths occurs inside a prism module. The optical signal multiplexer/demultiplexer of the invention is simple in construction, inexpensive to manufacture, highly efficient in operation due to conjugation of the signals of different wavelengths inside the prism module rather than outside the prism, and is suitable for mass production. The invention also provides a method of conjugating signals of different wavelengths inside a prism module during transmission and receiving of optical signals through a bidirectional optical signal multiplexer/demultiplexer.

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the optical signals may have wavelengths different from 1550 nm, 1480 nm, 1310 nm, 780 nm mentioned in the description. The signals may propagate in direction combinations different from those shown in FIG. 3. The prisms are not necessarily parallelogram prisms and may have any shape, provided that they have two pairs of parallel sides. Both prisms can be made from different optical materials and may have different dimensions. The collimators/focusators may have different constructions, such as lens-type, fiber tapered-type, etc.

The invention claimed is:

1. An optical signal multiplexer/demultiplexer for bidirectional transmission and reception of optical signals through individual channels capable of working in a transmitting and receiving modes simultaneously for transmitting and receiving a plurality of optical signals of different wavelengths through each individual channel, said optical signal multiplexer/demultiplexer comprising:

a plurality of optical prisms arranged in series and having coatings selective with respect to transmission and reflection of said optical signals of different wavelengths;

an inlet/outlet on one side thereof and an outlet/inlet on the other side thereof;

said optical signal multiplexer/demultiplexer passing one of said optical signals of different wavelengths from said inlet/outlet to said outlet/inlet and from said outlet/inlet to said inlet/outlet without substantially affecting said one of said optical signals, while processing the rest of said optical signals of different wavelengths;

said coatings comprising means for conjugation and separation of said optical signals of different wavelengths within said optical prisms;

wherein said plurality of optical prisms are combined into an integral unit and wherein said integral unit together with said inlet/outlet and said outlet/inlet comprise an optical module, and wherein said inlet/outlet comprises a first signal transmission/receiving channel, and said outlet/inlet comprises a second signal transmission/receiving channel and a third signal transmission/receiving channel, each said signal transmission/receiving channel comprising an optical fiber having an end facing to a respective optical prism and a collimator/focusator on said end of said optical fiber, said collimator/focusator acting as an optical collimator for optical signals transmitted from each optical fiber to a respective optical prism and as an optical focusator transmitted from each optical prism to a respective optical fiber, each said optical channel having an optical path for transmitting/receiving optical signals;

wherein said plurality of optical prisms comprises a first optical prism and a second optical prism, said first optical prism having a first side and a second side parallel to said first side; said second optical prism having a first side and a second side and being arranged in series with said first optical prism behind said second side of said first optical prism, said first side of said second optical prism being parallel to said second side of said first optical prism and facing said second side of said second optical prism, said second side of said second optical prism being parallel to said first side of said second optical prism and facing in a direction opposite to said first optical prism;

said optical signal multiplexer/demultiplexer transmitting and receiving a first-wavelength optical signal, a second-wavelength optical signal, and a third-wavelengths optical signal;

said coatings comprising:

a first antireflective coating formed on said first side of said first optical prism on the optical path of said first-wavelength optical signal, said second-wavelength optical signal, and said third-wavelength signal, said antireflective coating being transparent to said first-wavelength optical signal, said second-wavelength optical signal, and said third-wavelength optical signal;

a second coating formed on said second side of said first optical prism and transparent to said first-wavelength optical signal and said third-wavelength optical signal but reflective to said second-wavelength optical signal so that said second-wavelength optical signal is reflected from said second coating, while said first-wavelength optical signal and said third-wavelength optical signal pass through said second coating;

a third coating fully reflective to said second-wavelength optical signal, which is formed on said first side of said first optical prism and on an optical path of said second-wavelength optical signal reflected from said coating;

a fourth coating formed on said second side of said first optical prism and on an optical path of said second-wavelength optical signal reflected from said second coating, said fourth coating being transparent to said second-wavelength optical signal;

a fifth coating on said first side of said second optical prism which is transparent to said first-wavelength optical signal and said third-wavelength optical signal, said fifth coating being located on an optical path of said first-wavelength optical signal and said third wave-length optical signal;

a sixth coating formed on said second side of said second optical prism on an optical pass of said first-wavelength optical signal and said third wave-length optical signal, said sixth coating being transparent to said first-wavelength optical signal but being reflective to said third-wavelength optical signal, so that said first-wavelength optical signal passes through said sixth coating, while said third-wavelength optical signal is reflected from said sixth coating;

a seventh coating formed on said first side of said second optical prism on an optical path of said third-wavelength optical signal and on said optical path of said second-wavelength optical signal that passed through said fourth coating, said seventh coating being transparent to said second-wavelength optical signal, but being reflective to said third-wavelength optical signal; and an eighth coating formed on said second side of said second optical prism on an optical path of said second-wavelength optical signal and of said third-wavelength optical signal, said eighth coating being transparent to said second-wavelength optical signal and to said third-wavelength optical signal, so that said second-wavelength optical signal and said third-wavelength optical signal pass through said eighth coating;

said second channel being located on an optical path of said first-wavelength optical signal and said third channel being located on an optical paths of said second-wavelength optical signal and of said third optical signal.

2. The optical signal multiplexer/demultiplexer of claim 1, further comprising a mounting base for mounting said first optical prism, said second optical prism, said first channel signal input/output unit, said second channel signal input/output unit, and said third channel signal input/output unit and for optically aligning said optical paths of said first-wavelength optical signal, said second-wavelength optical signal, and of said third-wavelength optical signal with said coatings and with said signal input/output units.

3. The optical signal multiplexer/demultiplexer of claim 2, wherein said first-wavelength optical signal has a wavelength equal to about 1550 nm, said second-wavelength optical signal has a wavelength equal to about 1480 nm, and said third-wavelength optical signal has a wavelength equal to about 1310 nm.

4. The optical signal multiplexer/demultiplexer of claim 2, wherein said first-wavelength optical signal has a wavelength equal to about 1550 nm, said second-wavelength optical signal has a wavelength equal to about 1310 nm, and said third-wavelength optical signal has a wavelength equal to about 780 nm.

5. The optical signal multiplexer/demultiplexer of claim 1, wherein said first-wavelength optical signal has a wavelength equal to about 1550 nm, said second-wavelength optical signal has a wavelength equal to about 1480 nm, and said third-wavelength optical signal has a wavelength equal to about 1310 nm.

6. The optical signal multiplexer/demultiplexer of claim 1, wherein said first-wavelength optical signal has a wavelength equal to about 1550 nm, said second-wavelength optical signal has a wavelength equal to about 1310 nm, and said third-wavelength optical signal has a wavelength equal to about 780 nm.

7. An optical signal multiplexer/demultiplexer for bidirectional transmission and reception of optical signals through individual channels capable of working in a transmitting and receiving modes simultaneously for transmitting and receiving a first-wavelength optical signal, a second-wavelength optical signal, and a third-wavelengths optical signal, said optical signal multiplexer/demultiplexer comprising:
    a first optical prism having a first side and a second side parallel to said first side;
    a second optical prism arranged in series with said first optical prism behind said second side of said first optical prism, said second optical prism having a first side parallel to said second side of said first optical prism and facing thereto, and a second side parallel to said first side of said second optical prism and facing in a direction opposite to said first optical prism;
    a first channel signal input/output unit with a first optical beam processing unit on said first side of said first optical prism;
    a second channel signal output/input unit comprising a second optical beam processing unit on said second side of said second optical prism;
    a third channel signal output/input unit comprising a third optical beam processing unit on said second side of said second optical prism;
    a first antireflective coating formed on said first side of said first optical prism on the optical path of said first-wavelength optical signal, said second-wavelength optical signal, and said third-wavelength signal, said antireflective coating being transparent to said first-wavelength optical signal, said second-wavelength optical signal, and said third-wavelength optical signal;
    a second coating formed on said second side of said first optical prism and transparent to said first-wavelength optical signal and said third-wavelength optical signal but reflective to said second-wavelength optical signal so that said second-wavelength optical signal is reflected from said second coating, while said first-wavelength optical signal and said third-wavelength optical signal pass through said second coating;
    a third coating fully reflective to said second-wavelength optical signal, which is formed on said first side of said first optical prism and on an optical path of said second-wavelength optical signal reflected from said coating;
    a fourth coating formed on said second side of said first optical prism and on an optical path of said second-wavelength optical signal reflected from second coating, said fourth coating being transparent to said second-wavelength optical signal;
    a fifth coating on said first side of said second optical prism which is transparent to said first-wavelength optical signal and said third-wavelength optical signal, said fifth coating being located on an optical path of said first-wavelength optical signal and said third wave-length optical signal;
    a sixth coating formed on said second side of said second optical prism on an optical pass of said first-wavelength optical signal and said third wave-length optical signal, said sixth coating being transparent to said first-wavelength optical signal but being reflective to said third-wavelength optical signal, so that said first-wavelength optical signal passes through said sixth coating, while said third-wavelength optical signal is reflected from said sixth coating;
    a seventh coating formed on said first side of said second optical prism on an optical path of said third-wavelength optical signal and on said optical path of said second-wavelength optical signal that passed through said fourth coating, said seventh coating being transparent to said second-wavelength optical signal, but being reflective to said third-wavelength optical signal; and
    an eighth coating formed on said second side of said second optical prism on an optical path of said second-wavelength optical signal and of said third-wavelength optical signal, said eighth coating being transparent to said second-wavelength optical signal and to said third-wavelength optical signal, so that said second-wavelength optical signal and said third-wavelength optical signal pass through said eighth coating;
    said first channel signal input/output unit being located on an optical path of said first-wavelength optical signal, said second-wavelength optical signal, and said third-wavelength optical signal;
    said second channel signal input/output unit being located on an optical path of said first-wavelength optical signal; and
    said third channel signal input/output unit being located on an optical paths of said second-wavelength optical signal and of said third-wavelength optical signal.

8. The optical signal multiplexer/demultiplexer of claim 7, wherein each said channel signal input/output unit comprises an optical fiber having an end facing a respective optical prism and a collimator/focusator on said end of said optical fiber, said collimator/focusator acting as an optical collimator for optical signals transmitted from each optical fiber to a respective optical prism and as an optical focusator for an optical signal transmitted from each optical prism to a respective optical fiber.

9. The optical signal multiplexer/demultiplexer of claim 8, wherein said first-wavelength optical signal has a wavelength equal to about 1550 nm, said second-wavelength optical signal has a wavelength equal to about 1480 nm, and said third-wavelength optical signal has a wavelength equal to about 1310 nm.

10. The optical signal multiplexer/demultiplexer of claim 8, wherein said first wavelength optical signal has a wavelength equal to about 1550 nm, said second-wavelength optical signal has a wavelength equal to about 1310 nm, and said third-wavelength optical signal has a wavelength equal to about 780 nm.

* * * * *